(12) United States Patent
Tsutsui

(10) Patent No.: US 12,149,932 B2
(45) Date of Patent: Nov. 19, 2024

(54) RADIO TERMINAL, RAN NODE, CORE NETWORK NODE, AND METHODS THEREFOR

(71) Applicant: NEC Corporation, Tokyo (JP)

(72) Inventor: Takahiro Tsutsui, Tokyo (JP)

(73) Assignee: NEC CORPORATION, Tokyo (JP)

( * ) Notice: Subject to any disclaimer, the term of this patent is extended or adjusted under 35 U.S.C. 154(b) by 384 days.

(21) Appl. No.: 17/629,616

(22) PCT Filed: Dec. 28, 2020

(86) PCT No.: PCT/JP2020/049169
§ 371 (c)(1),
(2) Date: Jan. 24, 2022

(87) PCT Pub. No.: WO2021/153150
PCT Pub. Date: Aug. 5, 2021

(65) Prior Publication Data
US 2022/0248223 A1    Aug. 4, 2022

(30) Foreign Application Priority Data

Jan. 31, 2020    (JP) .................................. 2020-015021

(51) Int. Cl.
*H04W 12/06*     (2021.01)
*H04W 12/106*    (2021.01)
(Continued)

(52) U.S. Cl.
CPC ......... *H04W 12/06* (2013.01); *H04W 12/106* (2021.01); *H04W 48/10* (2013.01); *H04W 48/14* (2013.01)

(58) Field of Classification Search
CPC .............................. H04W 12/06; H04W 48/10
See application file for complete search history.

(56) References Cited

U.S. PATENT DOCUMENTS

2017/0295489 A1    10/2017  Agiwal et al.
2018/0124601 A1 *   5/2018  Vutukuri ............... H04W 48/14
(Continued)

FOREIGN PATENT DOCUMENTS

WO    WO-2020151957 A1 *  7/2020  ........ H04W 12/0431

OTHER PUBLICATIONS

International Search Report for PCT Application No. PCT/JP2020/049169, mailed on Apr. 6, 2021.
(Continued)

*Primary Examiner* — Kevin Kim
(74) *Attorney, Agent, or Firm* — Sughrue Mion, PLLC

(57) ABSTRACT

A RAN node (2) receives a message containing a Non-Access Stratum (NAS) security parameter from a radio terminal (1), during a procedure in which the radio terminal (1) requests the RAN node to broadcast on-demand system information. The RAN node (2) sends an authentication request message containing the NAS security parameter to a core network node (3), in order to request authentication of the radio terminal (1). The RAN node (2) broadcasts the on-demand system information in response to receiving from the core network node (3) an authentication response message indicating successful authentication of the radio terminal (1). This can contribute to, for example, preventing on-demand SI from being broadcast in response to a request from a malicious radio terminal.

17 Claims, 14 Drawing Sheets

(51) Int. Cl.
*H04W 48/10* (2009.01)
*H04W 48/14* (2009.01)

(56) References Cited

U.S. PATENT DOCUMENTS

2018/0279129 A1    9/2018  Vutukuri
2019/0261261 A1*   8/2019  Ishii .................... H04W 48/18

OTHER PUBLICATIONS

3GPP TS 38.300 V15.8.0 (Dec. 2019) "3rd Generation Partnership Project: Technical Specification Group Radio Access Network; NR: NR and NG-RAN Overall Description; Stage 2 (Release 15)", pp. 1-99.
3GPP TS 38.331 V15.8.0 (Dec. 2019) "3rd Generation Partnership Project; Technical Specification Group Radio Access Network; NR: Radio Resource Control (RRC) protocol specification (Release 15)", pp. 1-532.
S3-170104, Blackberry UK Ltd., "Handling of SI requests from unauthenticated UEs in NR", 3GPP TSG SA WG3 #86, Jan. 27, 2017, pp. 1-3.
Extended European Search Report for EP Application No. EP20916628.9 dated on Jul. 26, 2022.
BlackBerry UK Ltd., "Handling of SI requests from unauthenticated UEs in NR", 3GPP TSG RAN2 WG Meeting #96, R2-168359, Nov. 4, 2016, pp. 1-2.

* cited by examiner

| No. | AMF Set ID (10 bits) + AMF Pointer (6 bits) |
|---|---|
| 1 | 0000000001 000001 (0x0041) |
| 2 | 0000000001 000010 (0x0042) |
| 3 | 0000000001 000011 (0x0043) |
| 4 | 0000000010 000001 (0x0081) |
| 5 | 0000000010 000010 (0x0082) |
| 6 | 0000000010 000011 (0x0083) |

Fig. 10

RADIO TERMINAL, RAN NODE, CORE NETWORK NODE, AND METHODS THEREFOR

This application is a National Stage Entry of PCT/JP2020/049169 filed on Dec. 28, 2020, which claims priority from Japanese Patent Application 2020-015021 filed on Jan. 31, 2020, the contents of all of which are incorporated herein by reference, in their entirety.

TECHNICAL FIELD

The present disclosure relates to a radio communication network and, in particular, to broadcasting of on-demand system information.

BACKGROUND ART

In the 5G system (5GS), System Information (SI) includes a Master Information Block and a number of System Information Blocks (SIBs), which are divided into Minimum SI and Other SI. The Minimum SI is always being broadcast periodically and contains basic information required for initial access and information for acquiring any other SI. Specifically, the Minimum SI contains MIB and SIB type 1 (SIB1).

MIB is periodically transmitted on a Broadcast Channel (BCH) and a Physical Broadcast Channel (PBCH). The MIB contains information regarding cell barring and further contains essential physical layer information of the cell required to decode SIB1. More specifically, the MIB indicates a System Frame Number (SFN), a subcarrier spacing (subCarrierSpacingCommon) for SIB1, and a Physical Downlink Control Channel (PDCCH) configuration required to decode SIB1.

SIB1 is also referred to as Remaining Minimum SI (RMSI). SIB1 is periodically transmitted on a Downlink Shared Channel (DL-SCH) and a Physical Downlink Shared Channel (PDSCH). SIB1 indicates the availability and scheduling (e.g., periodicity and SI-window size) of Other SI (Other SIBs). SIB1 further indicates whether Other SIBs are provided via periodic broadcast or on-demand basis. Furthermore, SIB1 incudes information required for initial access.

Other SI includes all SIBs that are not broadcast within Minimum SI. These SIBs can be periodically broadcast on a DL-SCH, broadcast on-demand on a DL-SCH (i.e., upon request from User Equipments (UEs) in Resource Control (RRC)_IDLE or RRC_INACTIVE), or sent in a dedicated manner on a DL-SCH to UEs in RRC_CONNECTED. Other SI includes SIB2 to SIB5.

As mentioned above, in the 5GS, Other SI can be broadcast on-demand. Specifically, if required system information is not being broadcast, a UE in RRC_IDLE or RRC_INACTIVE send a request for specific system information to a Radio Access Network (RAN) node (e.g., base station, gNB). The request is sent during a contention-based random access procedure. Upon receiving the request from the UE, the RAN node broadcasts the requested system information.

More specifically, if a subset of random access resources (i.e., Physical Random Access Channel (PRACH) resources) for requesting the required system information is provided by SIB1, the UE selects a random access preamble from the subset and transmits the selected preamble. That is, in this case, the SI request is transmitted via a random access preamble, i.e., the first message (Msg1) of a (4-step) random access procedure. Otherwise, the UE transmits an SI request message (i.e., RRCSystemInfoRequest message) via initial RRC message transmission (i.e., the third message (Msg3) of the (4-step) random access procedure). The UE includes in the RRCSystemInfoRequest message a list (i.e., requested-SI-List) indicating required system information messages.

The system information of the 5GS and acquisition thereof are described, for example, in Section 7.3 of Non-Patent Literature 1 and Section 5.2.2.3 of Non-Patent Literature 2.

In this specification, the term "on-demand system information (SI)" is used. The on-demand SI means system information that is broadcast on-demand in response to a request from a radio terminal (e.g., UE), such as Other SI of the 5GS. In other words, the on-demand SI is system information that is not always periodically broadcast but is broadcast on-demand in response to a request from a radio terminal (e.g., UE).

CITATION LIST

Non-Patent Literature

[Non-Patent Literature 1] 3GPP TS 38.300 V15.8.0 (2019 December) "3rd Generation Partnership Project; Technical Specification Group Radio Access Network; NR; NR and NG-RAN Overall Description; Stage 2 (Release 15)", December 2019

[Non-Patent Literature 2] 3GPP TS 38.331 V15.8.0 (2019 December) "3rd Generation Partnership Project; Technical Specification Group Radio Access Network; NR; Radio Resource Control (RRC) protocol specification (Release 15)", December 2019

SUMMARY OF INVENTION

Technical Problem

The inventor has studied a procedure for requesting on-demand SI and found various problems. Specifically, for example, a RAN node (e.g., gNB) cannot identify or authenticate a radio terminal (e.g., UE) in a random access procedure for on-demand SI request. Accordingly, even if a malicious radio terminal requests the transmission of on-demand SI, the RAN node broadcasts the on-demand SI in response to the request. This may waste RAN node resources and radio resources.

One of the objects to be attained by embodiments disclosed herein is to provide apparatuses, methods, and programs that contribute to preventing on-demand SI from being broadcast in response to a request from a malicious radio terminal. It should be noted that this object is merely one of the objects to be attained by the embodiments disclosed herein. Other objects or problems and novel features will be made apparent from the following description and the accompanying drawings.

Solution to Problem

In a first aspect, a radio terminal includes at least one memory and at least one processor coupled to the at least one memory. The at least one processor is configured to transmit a message containing a Non-Access Stratum (NAS) security parameter to a RAN node, during a procedure for requesting the RAN node to broadcast on-demand SI.

In a second aspect, a RAN node includes at least one memory and at least one processor coupled to the at least one memory. The at least one processor is configured to receive a message containing a Non-Access Stratum (NAS) security parameter from a radio terminal, during a procedure in which the radio terminal requests the RAN node to broadcast on-demand SI. The at least one processor is further configured to send an authentication request message containing the NAS security parameter to a core network node, in order to request authentication of the radio terminal. Furthermore, the at least one processor is configured to broadcast the on-demand SI in response to receiving from the core network node an authentication response message indicating successful authentication of the radio terminal.

In a third aspect, a core network node includes at least one memory and at least one processor coupled to the at least one memory. The at least one processor is configured to receive an authentication request message from a Radio Access Network (RAN) node. The authentication request message contains a NAS security parameter being transmitted from a radio terminal during a procedure in which the radio terminal requests the RAN node to broadcast on-demand SI. The at least one processor is further configured to send to the RAN node an authentication response message indicating whether authentication based on the NAS security parameter is successful or not.

In a fourth aspect, a method performed by a radio terminal includes transmitting a message containing a Non-Access Stratum (NAS) security parameter to a Radio Access Network (RAN) node, during a procedure for requesting the RAN node to broadcast on-demand SI.

In a fifth aspect, a method performed by a RAN node includes the following steps:
(a) receiving a message containing a Non-Access Stratum (NAS) security parameter from a radio terminal, during a procedure in which the radio terminal requests the RAN node to broadcast on-demand SI;
(b) sending an authentication request message containing the NAS security parameter to a core network node, in order to request authentication of the radio terminal; and
(c) broadcasting the on-demand SI in response to receiving from the core network node an authentication response message indicating successful authentication of the radio terminal.

In a sixth aspect, a method performed by a core network node includes the following steps:
(a) receiving an authentication request message from a Radio Access Network (RAN) node, the authentication request message containing a NAS security parameter being transmitted from a radio terminal during a procedure in which the radio terminal requests the RAN node to broadcast on-demand SI; and
(b) sending to the RAN node an authentication response message indicating whether authentication based on the NAS security parameter is successful or not.

In a seventh aspect, a program includes instructions (software codes) that, when loaded into a computer, cause the computer to perform the method according to the above-described fourth, fifth, or sixth aspect.

Advantageous Effects of Invention

According to the above-described aspects, it is possible to provide apparatuses, methods, and programs that contribute to preventing on-demand SI from being broadcast in response to a request from malicious a radio terminal.

BRIEF DESCRIPTION OF DRAWINGS

FIG. 10 is a diagram showing an example of an AMF list according to an embodiment;

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and contribute to obtaining advantages different from one another.

The following descriptions on the embodiments mainly focus on the 3rd Generation Partnership Project (3GPP) fifth generation mobile communication system (5G system (5GS)). However, these embodiments may be applied to other cellular communication systems that support on-demand SI transmission similar to that of the 5GS.

First Embodiment

Figure 1:
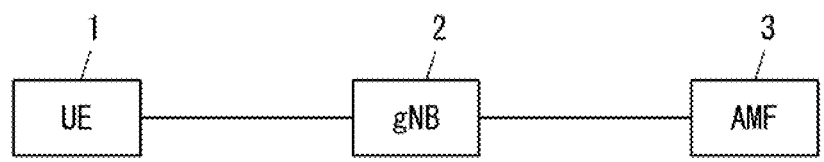
FIG. 1 is a diagram showing a configuration example of a radio communication network according to embodiments.

FIG. 1 shows a configuration example of a radio communication network (i.e., 5GS) according to the present embodiment. Each of the elements shown in FIG. 1 is a network function and provides an interface(s) defined by the 3GPP. Each element (or network function) shown in FIG. 1 can be implemented, for example, as a network element on dedicated hardware, as a software instance running on dedicated hardware, or as on a virtualized function instantiated on an application platform.

The radio communication network shown in FIG. 1 may be provided by a Mobile Network Operator (MNO) or may be a Non-Public Network (NPN) provided by a non-MNO. When the cellular network shown in FIG. 1 is an NPN, it may be an independent network called a Stand-alone Non-Public Network (SNPN) or an NPN linked with an MNO network called a public network integrated NPN.

In the example of FIG. 1, the radio communication network includes a radio terminal (i.e., UE) 1, a RAN node (i.e., gNB) 2, and a core network node (i.e., Access and Mobility Management Function (AMF)) 3. The gNB 2 is arranged in a RAN (i.e., Next Generation Radio Access Network (NG-RAN)). The gNB 2 may include a gNB Central Unit (gNB-CU) and one or more gNB Distributed Units (gNB-DU) in a cloud RAN (C-RAN) deployment.

The AMF 3 is one of the network functions in the 5G Core Network (5GC) Control Plane. The AMF 3 provides the termination of a RAN Control Plane (CP) interface (i.e., N2 interface). The AMF 3 terminates a single signaling connection (i.e., N1 NAS signaling connection) with the UE 1 and provides registration management, connection management, and mobility management. The AMF 3 provides NF services (services) to NF service consumers (e.g., other AMF, Session Management Function (SMF), and Authentication Server Function (AUSF)) on a service-based interface (i.e., Namf interface).

The following provides a description on a procedure for requesting on-demand SI according to the embodiment. In the present embodiment, Non-Access Stratum (NAS) security set up between the UE 1 and the 5GC (AMF 3) is used to determine whether an on-demand SI request (or UE 1 that transmitted it) is reliable or not.

More specifically, the UE 1 transmits a message containing a NAS security parameter to the gNB 2 during a procedure (i.e., random access procedure) for requesting the gNB 2 to transmit (or broadcast) on-demand SI. The UE 1 may transmit an Access Stratum (AS) message (e.g., Radio Resource Control (RRC) message) containing the NAS security parameter.

The gNB 2 retrieves the NAS security parameter from the message (e.g., RRC message) received from the UE 1. Then, in order to request authentication of the UE 1, the gNB 2 sends to the AMF 3 an authentication request message including the NAS security parameter received from the UE 1. The authentication request message may be a newly defined N2 message (e.g., Authentication Required message). The authentication request message may include a cause IE indicating UE authentication for sending on-demand SI.

In response to receiving the authentication request message from the gNB 2, the AMF 3 performs verification using the received NAS security parameter. This causes the AMF 3 to determine whether the genuine UE has transmitted the NAS security parameter (or on-demand SI request). The AMF 3 then sends an authentication response message to the gNB 2. The authentication response message indicates the result (i.e., success or failure) of the UE authentication based on the NAS security parameter.

The authentication response message is used by the gNB 2 to determine whether to broadcast the requested on-demand SI. Specifically, the gNB 2 broadcasts the requested on-demand SI in response to receiving from the AMF 3 the authentication response message indicating that the authentication of the UE 1 is successful. In other words, if the authentication response message indicates the success of the UE authentication, the authentication response message triggers the gNB 2 to broadcast the on-demand SI. On the other hand, if the authentication response message indicates the failure of the UE authentication, the gNB 2 does not need to broadcast the requested on-demand SI.

According to the above-described operation, the gNB 2 uses the NAS security set up between the UE 1 and the 5GC (AMF 3) to determine whether the on-demand SI request (or the UE 1 that transmitted it) is reliable. This behavior therefore can prevent the on-demand SI from being broadcast in response to a request from a malicious UE.

Figure 2:
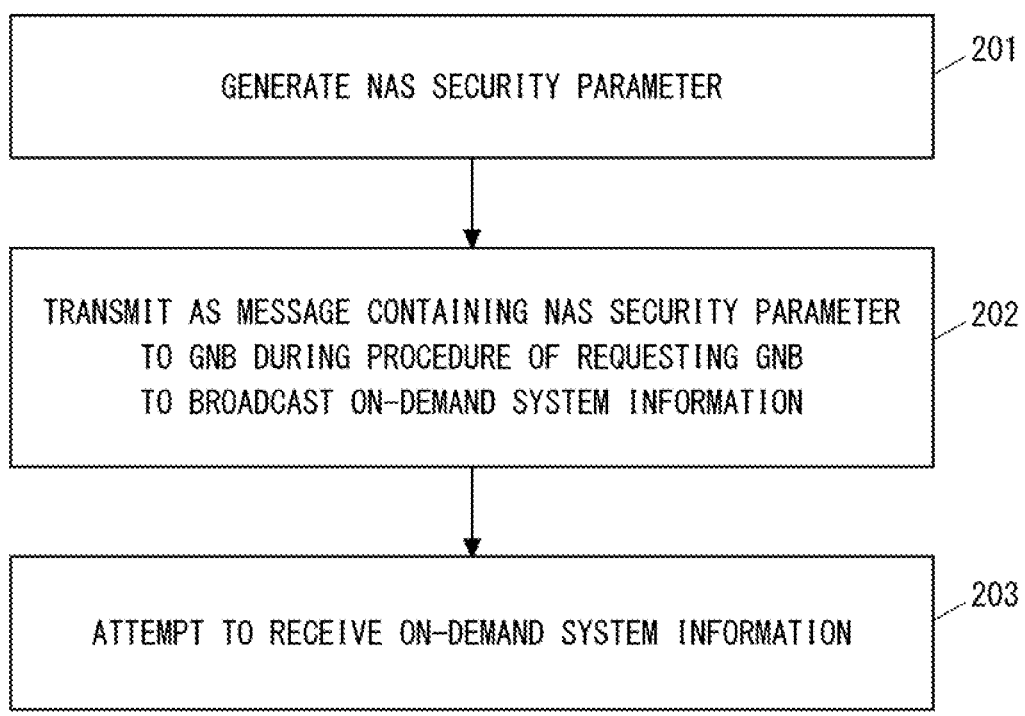
FIG. 2 is a flowchart showing an example of operation of a radio terminal (e.g., UE) according to an embodiment.

FIG. 2 shows an example of the operation of the UE 1. In step 201, the UE 1 generates a NAS security parameter. More specifically, the AS part (e.g., Radio Resource Control (RRC) layer) of the UE 1 triggers the NAS part of the UE 1 to provide the NAS security parameter.

In some implementations, the NAS security parameter includes a part of the bits of the Message Authentication Code for NAS for Integrity (NAS-MAC) calculated by the UE 1. The NAS security parameter may include the UL_NAS_MAC formed by a part of the 32 bits NAS-MAC (e.g., the first 16 bits). The NAS security parameter may further include a part (e.g., the lowest 5 bits (5 least significant bits (LSB)) of the bits of the NAS COUNT used to calculate the NAS-MAC.

In step 202, the UE 1 transmits an AS message (e.g., RRC message) containing the NAS security parameter to the gNB 2 during a procedure of requesting the gNB 2 to broadcast required on-demand SI. As described above, the procedure may be a random access procedure. In this case, the UE 1 may send the NAS security parameter via a third message (Msg3) of a 4-step random access procedure, i.e., via an initial RRC message.

The AS message (e.g., RRC message) in step 202 may include at least a part of a UE temporary identifier assigned to the UE 1 by the 5GC (e.g., AMF 3). The UE temporary identifier is used, for example, for contention resolution by the gNB 2, for routing (or AMF selection) by the gNB 2, and for UE identification by the AMF 3. The temporary identifier may be a 5G-S-Temporary Mobile Subscription Identifier (5G-S-TMSI). The 5G-S-TMSI has a 48-bit length. The 5G-S-TMSI consists of an AMF set ID (10 bits), an AMF pointer (6 bits), and a 5G TMSI (32 bits).

In the current 3GPP specifications, the bit length of the RRC message is 48 bits or 64 bits. Accordingly, if needed, the size (bit length) of the one or more information elements (i.e., the NAS security parameter, or the part of the UE temporary identifier, or both) carried by the 48-bit or 64-bit RRC message (step 202) may be adjusted. Details of this will be described in another embodiment described below.

In step 203, the UE 1 attempts to receive the on-demand SI. Specifically, when the UE 1 receives an acknowledgment for the SI request from the gNB 2, the UE 1 attempts (or starts) the reception of the on-demand SI. The acknowledgment for the SI request may be a fourth message (Msg4) of the random access procedure. The Msg4 contains a MAC Protocol Data Unit (PDU) that carries a UE Contention Resolution Identity Medium Access Control (MAC) Control Element (CE).

Figure 3:
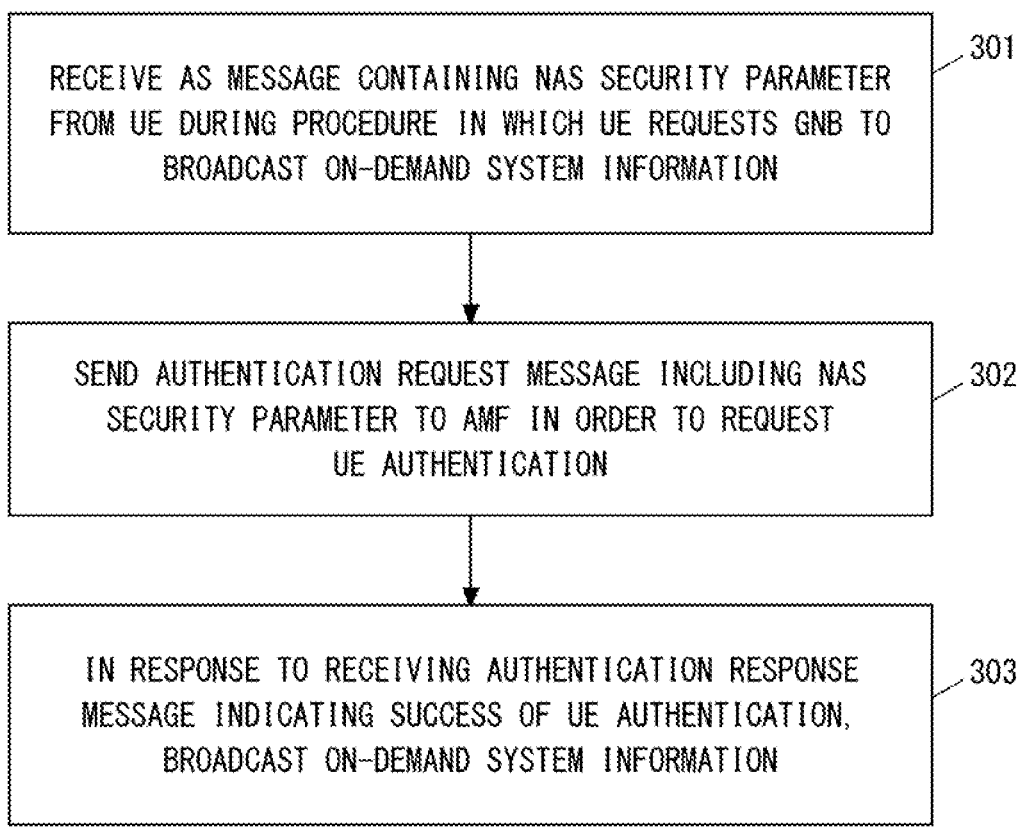
FIG. 3 is a flowchart showing an example of operation of a RAN node (e.g., gNB) according to an embodiment.

FIG. 3 shows an example of the operation of the gNB 2. In step 301, the gNB 2 receives an AS message (e.g., RRC message) containing a NAS security parameter from the UE 1 during a procedure in which the UE 1 requests the gNB 2 to broadcast on-demand SI. As described above, the procedure may be a random access procedure. In this case, the gNB 2 may receive the NAS security parameter via a third message (Msg3) of a 4-step random access procedure, i.e., via an initial RRC message. Specific examples of the NAS security parameter are similar to those described with respect to FIG. 2. In addition, as described with respect to FIG. 2, the AS message in step 301 may include at least a portion of a UE temporary identifier (e.g., 5G-S-TMSI).

In step 302, the gNB 2 sends an authentication request message including the NAS security parameter to the AMF 3 in order to request UE authentication. The gNB 2 may select the AMF 3 based on the UE temporary identifier (e.g., 5G-S-TMSI) included in the AS message in step 301. The authentication request message may be a newly defined N2 message (e.g., Authentication Required message). The authentication request message may include a cause IE indicating UE authentication for sending on-demand SI.

In step 303, the gNB 2 receives an authentication response message indicating the result (i.e., success or failure) of the UE authentication from the AMF 3. If the authentication response message indicates the success of the UE authentication, then the gNB 2 broadcasts the requested on-demand SI.

Figure 4:
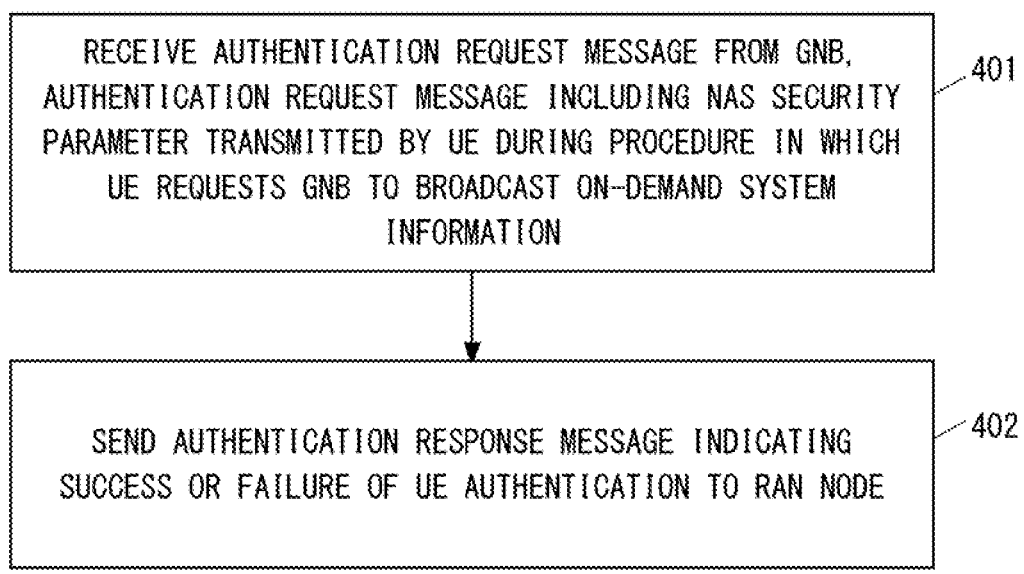
FIG. 4 is a flowchart showing an example of operation of a core network node (e.g., AMF) according to an embodiment.

FIG. 4 shows an example of the operation of the AMF 3. In step 401, the AMF 3 receives an authentication request message from the gNB 2. The authentication request message includes a NAS security parameter transmitted by the UE 1 during a procedure in which the UE 1 requests the gNB 2 to broadcast on-demand SI. Specific examples of the NAS security parameter are similar to those described with respect to FIG. 2. The authentication request message may be a newly defined N2 message (e.g., Authentication Required message). The authentication request message may include a cause IE indicating UE authentication for sending on-demand SI.

In step 402, the AMF 3 performs verification using the received NAS security parameter. The AMF 3 then sends an authentication response message to the gNB 2. The authentication response message indicates the result (i.e., success or failure) of the UE authentication based on the NAS security parameter.

Figure 5:
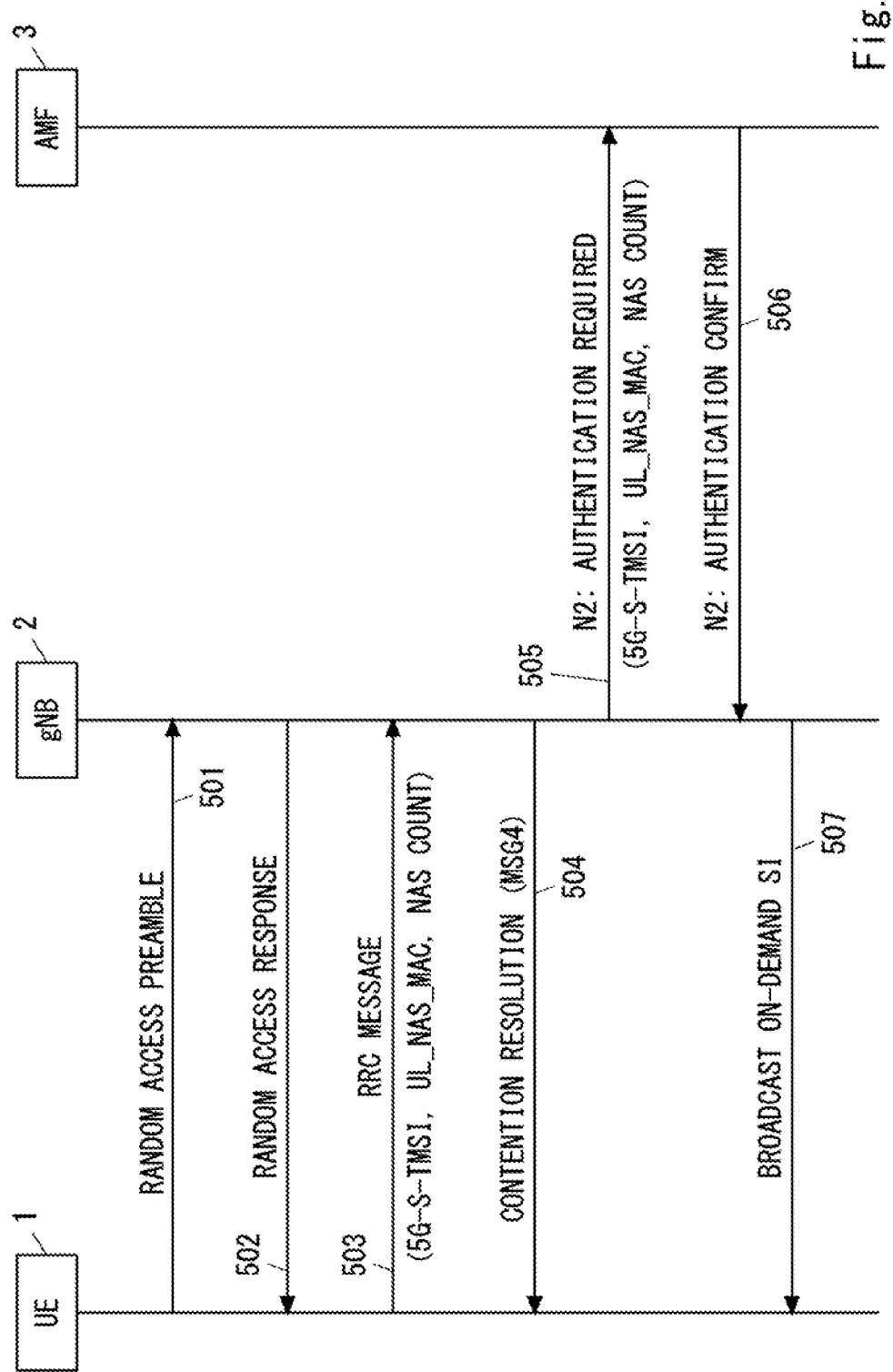
FIG. 5 is a sequence diagram showing a procedure for requesting on-demand SI.

FIG. 5 shows an example of an on-demand SI request procedure according to the present embodiment. Steps 501 to 504 correspond to the first to fourth steps of the 4-step contention-based random access procedure. In step 501, the UE 1 transmits a random access preamble for an on-demand SI request. More specifically, if SIB1 provides a subset of random access resources (i.e., PRACH resources) for required on-demand SI, the UE selects a random access preamble from this subset and transits the selected preamble. Otherwise, the UE 1 selects a random access preamble from the normal random access resources and sends the selected preamble.

In step 502, the gNB 2 transmits a random access response (Random Access Response (RAR)). The RAR indicates a detected preamble identifier, timing alignment information, an initial uplink resource grant for sending the third message, and an assignment of a temporary Cell Radio Network Temporary Identifier (C-RNTI).

In step 503, in response to receiving the RAR, the UE 1 transmits an RRC message regarding the on-demand SI request. The RRC message includes a NAS security parameter. Specifically, the RRC message contains an UL_NAS_MAC consisting of a part (e.g., the first 16 bits) of the bits of a NAS-MAC calculated by the UE 1, and also contains a part (e.g., the lowest 5 bits) of the bits of a NAS COUNT which was used to calculate the NAS-MAC. The RRC message further includes at least a portion of a 5G-S-TMSI assigned to the UE 1 by the 5GC (i.e., AMF3).

The RRC message in step 503 may or may not include a list (i.e., requested-SI-List) indicating required system information messages. Specifically, if SIB1 provides a subset of random access resources (i.e., PRACH resources) for required on-demand SI, then the RRC message does not need to include a requested-SI-List.

The RRC message in step 503 may be a modification (e.g., RRCSystemInfoRequest1 message) of the existing RRCSystemInfoRequest message. Specifically, the existing RRCSystemInfoRequest message is 48 bits long, whereas the RRC message in step 503 may be 64 bits long.

In step 504, the gNB 2 transmits a fourth message (Msg4) for contention resolution. The Msg4 includes a MAC PDU that carries a UE Contention Resolution Identity MAC CE.

In step 505, the gNB 2 sends an authentication request message (e.g., N2: Authentication Required message) to the AMF 3. The authentication request message includes the NAS security parameter (i.e., UL_NAS_MAC and a part of NAS COUNT), which has been received from the UE in step 503.

The authentication request message further includes a 5G-S-TMSI of the UE 1. If the RRC message in step 503 contains only part of the 5G-S-TMSI, the gNB 2 may estimate the entire 5G-S-TMSI.

The authentication request message may include other parameters related to the NAS security. For example, the authentication request message may include other parameters necessary for calculating NAS-MAC/XNAS-MAC in the Integrity Algorithm used for the NAS security. In one example, a Cell-ID may be used as the message to be protected in the calculation of the NAS-MAC by the UE 1. In this case, the gNB 2 may include the Cell-ID in the authentication request message.

The authentication request message may include a cause IE indicating UE authentication for sending on-demand SI.

In step 506, the AMF 3 performs UE authentication based on the received NAS security parameter (i.e., UL_NAS_MAC and a part of NAS COUNT). Specifically, the AMF 3 calculates the XNAS-MAC using the same inputs that the UE 1 used to calculate the NAS-MAC. Then, the AMF 3 compares the received UL_NAS_MAC with the corresponding bits (e.g., the first 16 bits) of the XNAS-MAC. If they are the same, the AMF 3 determines that the UE authentication is successful. In other words, the AMF 3 determines that the genuine UE has transmitted the NAS security parameter (or on-demand SI request).

For example, in the NAS-MAC/XNAS-MAC calculation, the 32-bit NAS COUNT, the 5-bit bearer identity (i.e., BEARER), the 1-bit direction of transmission (i.e., DIRECTION), and the message to be protected (i.e., MESSAGE) is used. The AMF 3 estimates the entire uplink NAS COUNT from the part (e.g., 5 LSB) of the received NAS COUNT. Specifically, the AMF 3 may replace the corresponding bits of the 32-bit uplink NAS COUNT managed by the AMF 3 itself with the part (e.g., 5 LSB) of the NAS COUNT received from the UE 1 via the gNB 2. The BEARER bits are a predetermined fixed value (e.g., zero). The DIRECTION bit is zero for the uplink. The MESSAGE bits may be a predetermined fixed value or may be a Cell-ID as described above.

The AMF 3 sends an authentication response message indicating the result of the UE authentication to the gNB 2. The AMF3 may send an authentication success message (e.g., N2: Authentication Confirm message) if the UE authentication is successful, and it may send an authentication failure message (e.g., N2: Authentication Failure message) if the UE authentication is unsuccessful.

In step 507, the gNB 2 broadcasts the requested on-demand SI in response to receiving the authentication response message indicating the success of UE authentication. The UE 1 attempts to receive the on-demand SI after receiving the acknowledgement message (Msg4) in step 504 and receives the on-demand SI in step 507.

The procedure shown in FIG. 5 is an example and can be appropriately modified. For example, the 4-step random access procedure of FIG. 5 may be changed to a 2-step random access procedure. The 2-step random access procedure includes sending a message A from the UE 1 to the gNB 2 and sending a message B from the gNB 2 to the UE 1. The message A may include the same information as the first message (step 501) and the third message (step 503) of the 4-step random access procedure. The message B may include information for contention resolution similar to the fourth message (step 504) of the 4-step random access procedure.

Additionally, or alternatively, in step 504, the gNB 2 may include in the acknowledgement message (Msg4) an indication indicating a waiting time until broadcast of the on-demand SI is started. The waiting time may be determined based on the time required to complete the UE authentication (steps 505 and 506). The waiting time may be dynamically determined by the gNB 2. The UE 1 may delay the start of the attempt of on-demand SI reception in consideration of the waiting time of which the UE 1 was notified by gNB2. As a result, the UE 1 does not need to start receiving the on-demand SI immediately after receiving the acknowledgement message (Msg4), and accordingly the power consumption of the UE1 can be suppressed.

Additionally, or alternatively, the transmission (step 504) of the acknowledgement message (Msg4) may be performed after the UE authentication (steps 505 and 506).

Second Embodiment

This embodiment provides a modified example of the first embodiment. A configuration example of a radio communication network according to the present embodiment is the same as that shown in FIG. 1.

Figure 6:
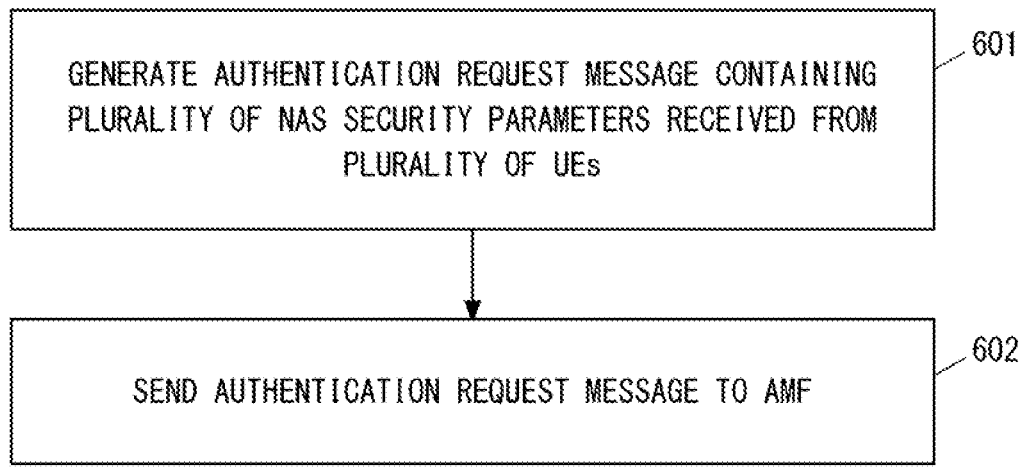
FIG. 6 is a flowchart showing an example of operation of a RAN node (e.g., gNB) according to an embodiment.

FIG. 6 shows an example of the operation of the gNB 2 according to the present embodiment. In step 601 the gNB 2 generates a single authentication request message containing a plurality of NAS security parameters received from a plurality of the UEs 1. The gNB 2 may aggregate SI requests from a plurality of UEs received within a predetermined time window. In some implementations, the gNB 2 may generate one authentication request message containing multiple NAS security parameters received from multiple UEs 1 managed by the same AMF 3. Alternatively, the gNB 2 may generate one authentication request message containing multiple NAS security parameters received from multiple UEs 1 managed by the same AMF 3 and requesting the same on-demand SI message. In step 602, the gNB 2 sends the generated authentication request message to the AMF 3.

Figure 7:
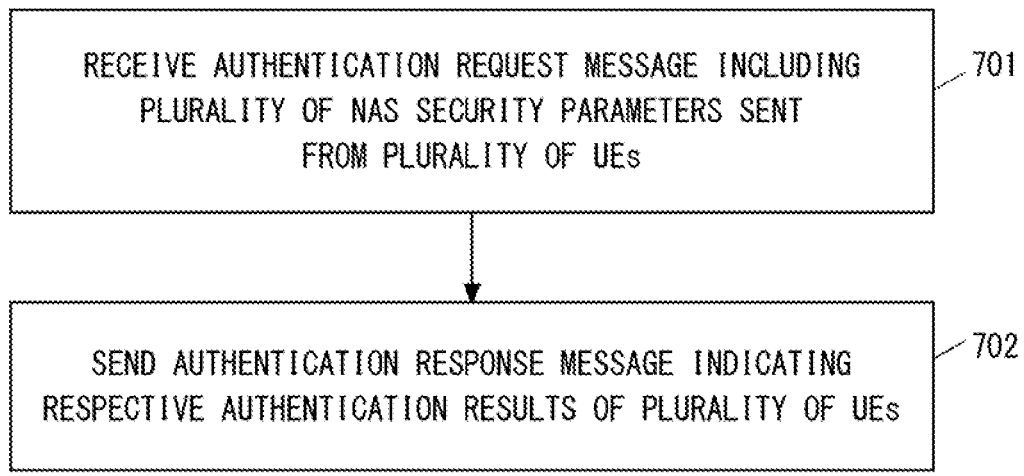
FIG. 7 is a flowchart showing an example of operation of a core network node (e.g., AMF) according to an embodiment.

FIG. 7 shows an example of the operation of the AMF 3 according to this embodiment. In step 701, the AMF 3 receives from the gNB 2 a single authentication request message including a plurality of NAS security parameters sent from a plurality of UEs 1. In step 702, the AMF 3 sends a single authentication response message indicating the respective authentication results of the plurality of UEs to the gNB 2. The gNB 2 broadcasts one or more on-demand SI messages requested by one or more successfully authenticated UEs.

As described above, in the present embodiment, the gNB 2 sends a single authentication request message including a plurality of NAS security parameters received from a plurality of UEs 1 to the AMF 3, and the AMF 3 sends to the gNB 2 an authentication response message indicating the authentication result of each of these UEs. This contributes to reducing the number of times the authentication request and authentication response messages are sent and received.

Third Embodiment

This embodiment provides a modified example of the second embodiment. A configuration example of a radio communication network according to the present embodiment is the same as that shown in FIG. 1.

Figure 8:
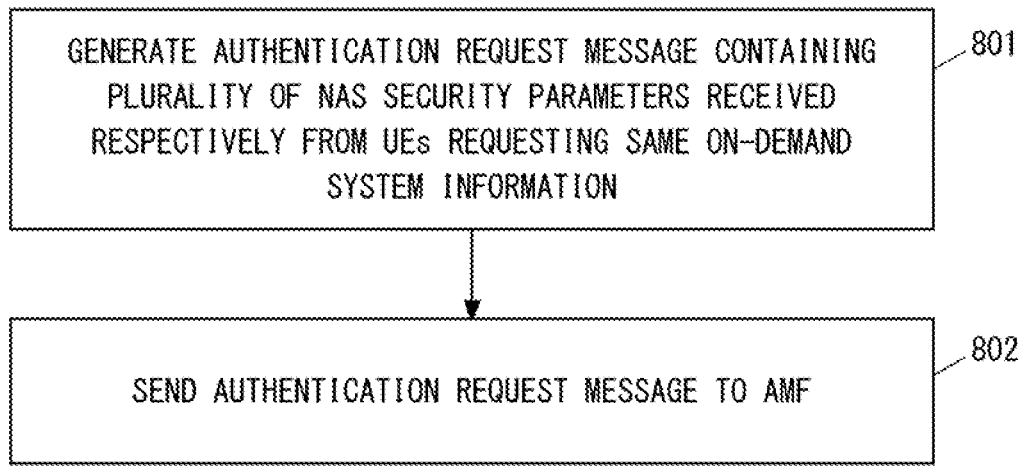
FIG. 8 is a flowchart showing an example of operation of a RAN node (e.g., gNB) according to an embodiment.

FIG. 8 shows an example of the operation of the gNB 2 according to the present embodiment. In step 801 the gNB 2 generates a single authentication request message containing a plurality of NAS security parameters received from a plurality of UEs 1 managed by the same AMF 3 and requesting the same on-demand SI message. The gNB 2 may aggregate SI requests from a plurality of UEs received within a predetermined time window. In step 802, the gNB 2 sends the generated authentication request message to the AMF 3.

Figure 9:
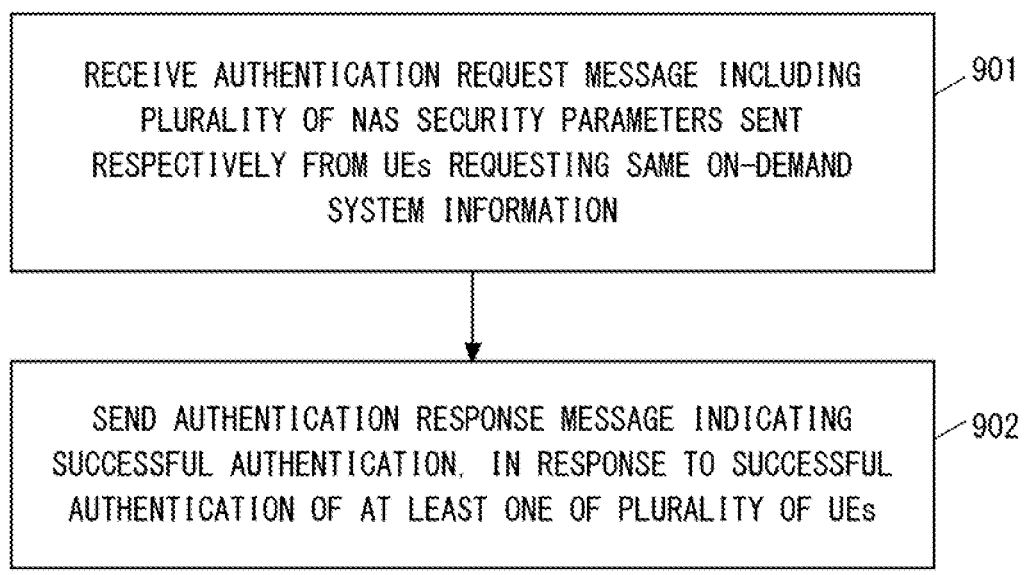
FIG. 9 is a flowchart showing an example of operation of a core network node (e.g., AMF) according to an embodiment.

FIG. 9 shows an example of the operation of the AMF 3 according to this embodiment. In step 901, the AMF 3 receives an authentication request message from the gNB 2. The authentication request message includes a plurality of NAS security parameters that have been received from a plurality of UEs 1 requesting the same on-demand SI message.

In step 902, the AMF3 sends an authentication response message indicating successful authentication, in response to successful authentication of at least one of the plurality of UEs. The authentication response message does not need to show the respective authentication results of the plurality of UEs, and it is sufficient to show the result of one authentication. If the AMF 3 succeeds in authenticating one of the multiple UEs associated with one authentication request message, it may skip (or omit) the authentications of the remaining UEs. If the AMF 3 succeeds in authenticating one of the multiple UEs associated with one authentication request message, it may immediately send an authentication response message indicating successful authentication without waiting for the authentications of the remaining UEs to be completed. The gNB 2 broadcasts the requested on-demand SI message in response to receiving the authentication response message indicating successful authentication.

As described above, in the present embodiment, the gNB 2 sends to the AMF 3 a single authentication request message including a plurality of NAS security parameters received from a plurality of UEs 1 that are managed by the same AMF 3 and request the same on-demand SI message. Then, the AMF 3 sends an authentication response message indicating successful authentication in response to the success of the authentication of at least one of the plurality of UEs. This makes the UE authentication suitable for on-demand SI transmission purposes.

Specifically, if the AMF 3 succeeds in authenticating one UE out of multiple UEs associated with one authentication request message, it can skip (or omit) the authentications of the remaining UEs. This allows the load of UE authentications in the AMF 3 to be reduced. In addition, if the AMF 3 succeeds in authenticating one of multiple UEs associated with one authentication request message, it can immediately send an authentication response message indicating successful authentication without waiting for the authentications of the remaining UEs to be completed. This can reduce the delay in starting the on-demand SI broadcast.

Fourth Embodiment

This embodiment provides a modified example of the first embodiment. A configuration example of a radio communication network according to the present embodiment is the same as that shown in FIG. 1. This embodiment is aimed at reducing the size of data to be transmitted by an AS message (e.g., RRC messages) from the UE 1 to the gNB 2 for an on-demand SI request.

As already described, in the current 3GPP specifications, the bit length of the RRC message is 48 bits or 64 bits. This embodiment provides specific examples of adjusting the size (bit length) of one or more information elements (i.e., NAS security parameter, or part of a UE temporary identifier, or both) carried by the 48-bit or 64-bit RRC message (e.g., steps 202 and 503). The specific examples shown below may be used in combination as appropriate.

In the first example, the size of UL_NAS_MAC included in a NAS security parameter is adjusted. If a 64-bit RRC message contains the NAS security parameter in addition to 5G-S-TMSI (48 bits), the NAS security parameter must be 16 bits or less. This reduces the number of bits in the UL_NAS_MAC. For example, the UE 1 may use the first 11 bits or less of the calculated NAS MAC as the UL_NAS_MAC.

In the second example, the size of a part of UL COUNT included in the NAS security parameter is adjusted. For example, the UE 1 may transmit the LSB 4 bits or LSB 3 bits of the NAS COUNT.

In the third example, 5G-S-TMSI is shortened. The complete 5G-S-TMSI has a 48-bit length and consists of an AMF set ID (10 bits), an AMF pointer (6 bits), and a 5G TMSI (32 bits). Shortening the 5G TMSI is not appropriate as it makes the UE identification by the AMF 3 difficult. On the other hand, the AMF set ID and AMF pointer may be replaced with a shortened bit sequence as shown below.

The gNB 2 manages a list of AMFs to which the gNB 2 is connected. FIG. 10 shows an example of the AMF list managed by the gNB 2. The AMF list of FIG. 10 shows six AMFs, and these six AMFs are assigned sequence numbers. Accordingly, by using the AMF list of FIG. 10, the six AMFs connected to the gNB 2 can be distinguished by the 3-bit words representing their sequence numbers. The example of FIG. 10 is merely an example. If the bit length of the AMF sequence number (or identifier) after replacement is smaller than the total size (i.e., 16 bits) of the AMF set ID and the AMF pointer, the data reduction effect can be obtained.

Figure 11:
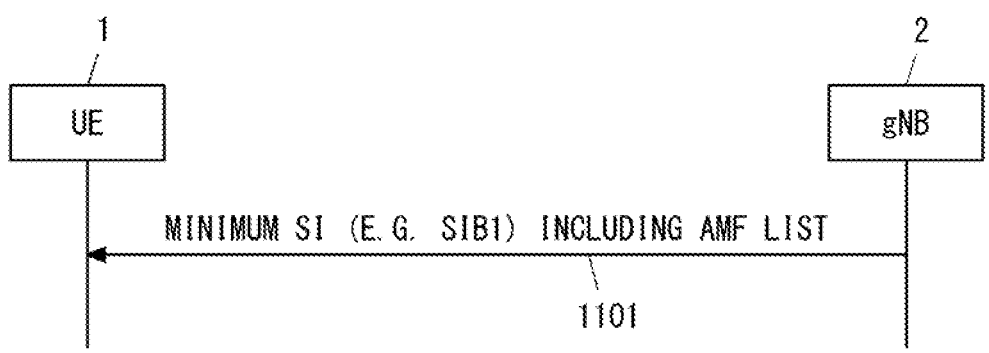
FIG. 11 is a diagram showing an example of AMF list transmission according to an embodiment.

In some implementations, as shown in FIG. 11, the gNB 2 periodically broadcasts an AMF list (e.g., FIG. 10) via minimum SI (e.g., SIB1) or via another SIB (step 1101). The UE 1 receives the SIB carrying the AMF list. Then, using this list, the UE 1 may shorten the AMF set ID and AMF pointer of the 5G-S-TMSI included in an RRC message (e.g., steps 202 and 503) carrying a NAS security parameter.

Figure 12:
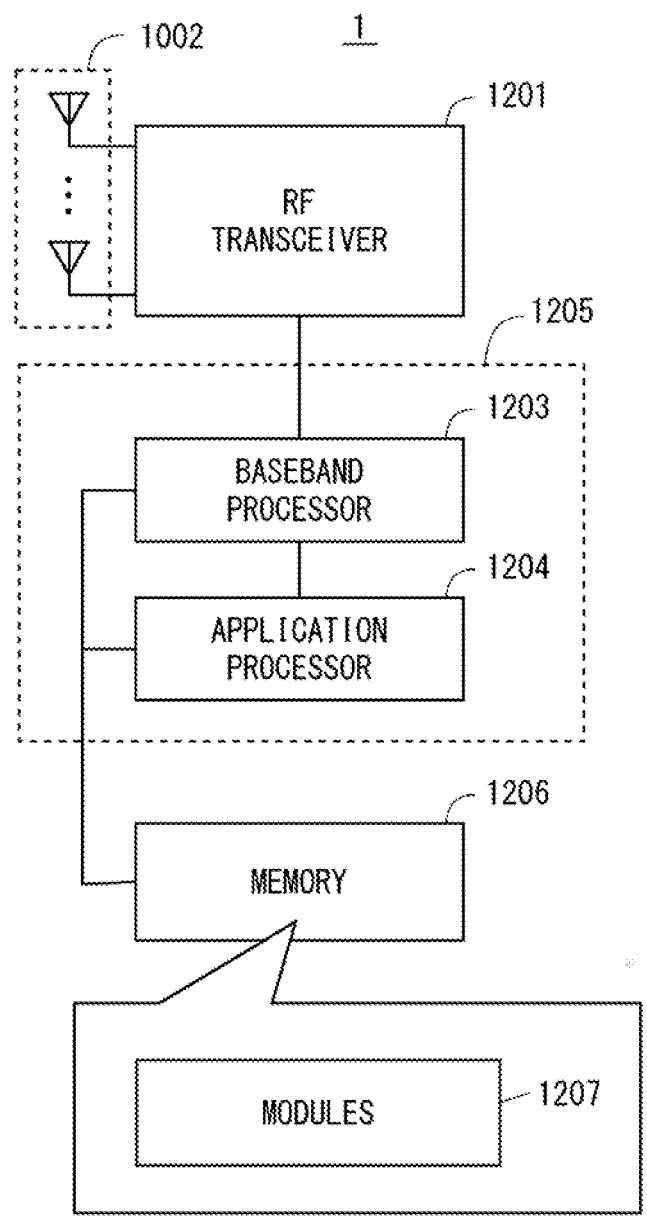
FIG. 12 is a block diagram showing a configuration example of a radio terminal (e.g., UE) according to embodiments.

The following provides configuration examples of the UE 1, the gNB 2, and the AMF 3 according to the above-described embodiments. FIG. 12 is a block diagram showing a configuration example of the UE 1. A Radio Frequency (RF) transceiver 1201 performs analog RF signal processing to communicate with NG-RAN nodes. The RF transceiver 1201 may include a plurality of transceivers. The analog RF signal processing performed by the RF transceiver 1201 includes frequency up-conversion, frequency down-conversion, and amplification. The RF transceiver 1201 is coupled to an antenna array 1202 and a baseband processor 1203. The RF transceiver 1201 receives modulated symbol data (or OFDM symbol data) from the baseband processor 1203, generates a transmission RF signal, and supplies the transmission RF signal to the antenna array 1202. Further, the RF transceiver 1201 generates a baseband reception signal based on a reception RF signal received by the antenna array 1202 and supplies the baseband reception signal to the baseband processor 1203. The RF transceiver 1201 may include an analog beamformer circuit for beam forming. The analog beamformer circuit includes, for example, a plurality of phase shifters and a plurality of power amplifiers.

The baseband processor 1203 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1203 may include, for example, signal processing of a Service Data Adaptation Protocol (SDAP) layer, a Packet Data Convergence Protocol (PDCP) layer, a Radio Link Control (RLC) layer, a Medium Access Control (MAC) layer, and a Physical (PHY) layer. Further, the control-plane processing performed by the baseband processor 1203 may include processing of Non-Access Stratum (NAS) protocols, RRC protocols, and MAC CEs.

The baseband processor 1203 may perform Multiple Input Multiple Output (MIMO) encoding and pre-coding for beam forming.

The baseband processor 1203 may include a modem processor (e.g., Digital Signal Processor (DSP)) that performs the digital baseband signal processing and a protocol stack processor (e.g., a Central Processing Unit (CPU) or a Micro Processing Unit (MPU)) that performs the control-plane processing. In this case, the protocol stack processor, which performs the control-plane processing, may be integrated with an application processor 1204 described in the following.

The application processor 1204 is also referred to as a CPU, an MPU, a microprocessor, or a processor core. The application processor 1204 may include a plurality of processors (or processor cores). The application processor 1204 loads a system software program (Operating System (OS)) and various application programs (e.g., a call application, a WEB browser, a mailer, a camera operation application, and a music player application) from a memory 1206 or from another memory (not shown) and executes these programs, thereby providing various functions of the UE 1.

In some implementations, as represented by a dashed line (1205) in FIG. 12, the baseband processor 1203 and the application processor 1204 may be integrated on a single chip. In other words, the baseband processor 1203 and the application processor 1204 may be implemented in a single System on Chip (SoC) device 1205. An SoC device may be referred to as a Large-Scale Integration (LSI) or a chipset.

The memory 1206 is a volatile memory, a non-volatile memory, or a combination thereof. The memory 1206 may include a plurality of memory devices that are physically independent from each other. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1206 may include, for example, an external memory device that can be accessed from the baseband processor 1203, the application processor 1204, and the SoC 1205. The memory 1206 may include an internal memory device that is integrated in the baseband processor 1203, the application processor 1204, or the SoC 1205. Further, the memory 1206 may include a memory in a Universal Integrated Circuit Card (UICC).

The memory 1206 may store one or more software modules (computer programs) 1207 including instructions and data to perform the processing by the UE 1 described in the above embodiments. In some implementations, the baseband processor 1203 or the application processor 1204 may load these software modules 1207 from the memory 1206 and execute the loaded software modules, thereby performing the processing of the UE 1 described in the above embodiments with reference to the drawings.

The control-plane processing and operations performed by the UE 1 described in the above embodiments can be achieved by elements other than the RF transceiver 1201 and the antenna array 1202, i.e., achieved by the memory 1206, which stores the software modules 1207, and one or both of the baseband processor 1203 and the application processor 1204.

Figure 13:
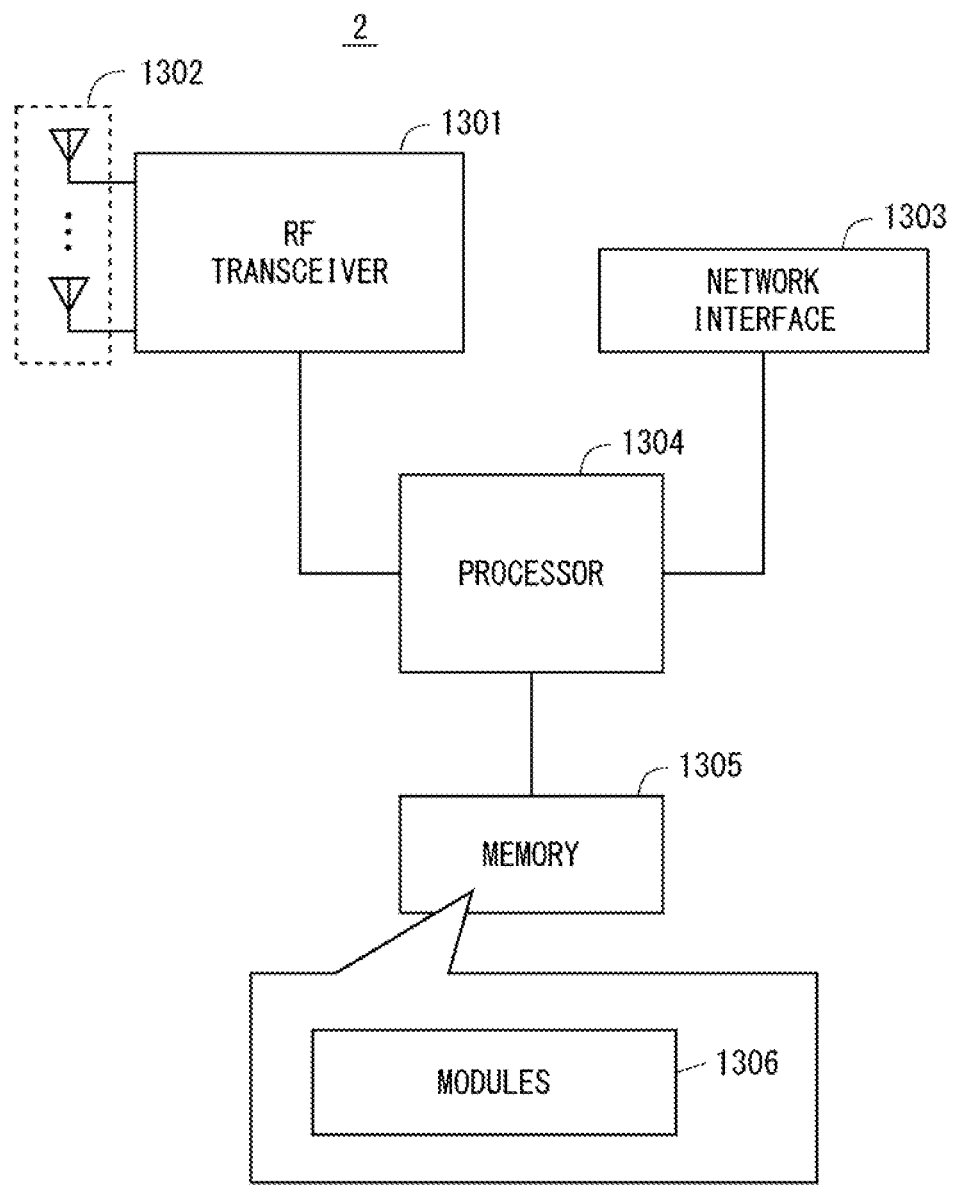
FIG. 13 is a block diagram showing a configuration example of a RAN node (e.g., gNB) according to embodiments.

FIG. 13 is a block diagram showing a configuration example of the gNB 2 according to the above-described embodiments. Referring to FIG. 13, the gNB 2 includes a Radio Frequency transceiver 1301, a network interface 1303, a processor 1304, and a memory 1305. The RF transceiver 1301 performs analog RF signal processing to communicate with UEs including the UE 1. The RF transceiver 1301 may include a plurality of transceivers. The RF transceiver 1301 is coupled to an antenna array 1302 and the processor 1304. The RF transceiver 1301 receives modulated symbol data from the processor 1304, generates a transmission RF signal, and supplies the transmission RF signal to the antenna array 1302. Further, the RF transceiver 1301 generates a baseband reception signal based on a reception RF signal received by the antenna array 1302 and supplies the baseband reception signal to the processor 1304. The RF transceiver 1301 may include an analog beamformer circuit for beam forming. The analog beamformer circuit includes, for example, a plurality of phase shifters and a plurality of power amplifiers.

The network interface 1303 is used to communicate with network nodes (e.g., the AMF 3 and a Session Management Function (SMF)). The network interface 1303 may include, for example, a network interface card (NIC) conforming to the IEEE 802.3 series.

The processor 1304 performs digital baseband signal processing (i.e., data-plane processing) and control-plane processing for radio communication. The processor 1304 may include a plurality of processors. The processor 1304 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing.

The digital baseband signal processing by the baseband processor 1304 may include, for example, signal processing of a Service Data Adaptation Protocol (SDAP) layer, a Packet Data Convergence Protocol (PDCP) layer, a Radio Link Control (RLC) layer, a MAC layer, and a PHY layer. The control-plane processing performed by the baseband processor 1304 may include processing of Non-Access Stratum (NAS) messages, RRC messages, MAC CEs, and DCIs.

The processor 1304 may include a digital beamformer module for beam forming. The digital beamformer module may include a Multiple Input Multiple Output (MIMO) encoder and a pre-coder.

The memory 1305 is composed of a combination of a volatile memory and a non-volatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1305 may include a storage located apart from the processor 1304. In this case, the processor 1304 may access the memory 1305 via the network interface 1303 or an I/O interface (not shown).

The memory 1305 may store one or more software modules (computer programs) 1306 including instructions and data to perform processing by the gNB 2 described in the above embodiments. In some implementations, the processor 1304 may be configured to load the software modules 1306 from the memory 1305 and execute the loaded software modules, thereby performing processing of the gNB 2 described in the above embodiments.

When the gNB 2 is a gNB-CU, the gNB 2 does not need to include the RF transceiver 1301 (and the antenna array 1302).

Figure 14:
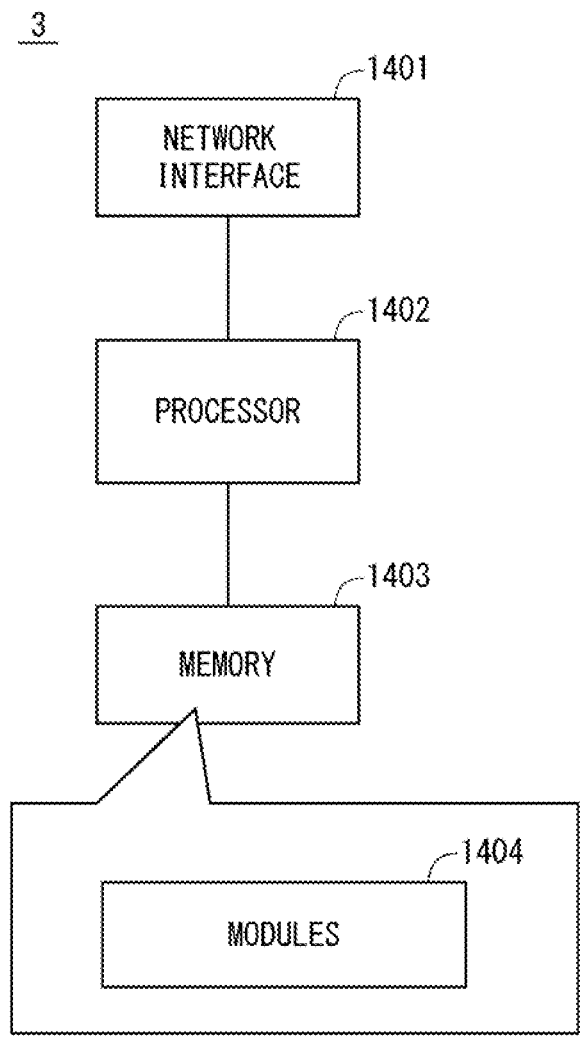
FIG. 14 is a block diagram showing a configuration example of a core network node (e.g., AMF) according to embodiments.

FIG. 14 is a block diagram showing a configuration example of the AMF 3. Referring to FIG. 14, the AMF 3 includes a network interface 1401, a processor 1402, and a memory 1403. The network interface 1401 is used to communicate, for example, with RAN nodes and with other network functions (NFs) or nodes in the 5GC. The other NFs or nodes in the 5GC include, for example, another AMF, a Unified Data Management (UDM), an Authentication Server Function (AUSF), a Session Management Function (SMF), and Policy Control Function (PCF). The network interface 1401 may include, for example, a network interface card (NIC) conforming to the IEEE 802.3 series.

The processor 1402 may be, for example, a microprocessor, a Micro Processing Unit (MPU), or a Central Processing Unit (CPU). The processor 1402 may include a plurality of processors.

The memory 1403 is composed of a volatile memory and a nonvolatile memory. The volatile memory is, for example, a Static Random Access Memory (SRAM), a Dynamic RAM (DRAM), or a combination thereof. The non-volatile memory is, for example, a Mask Read Only Memory (MROM), an Electrically Erasable Programmable ROM (EEPROM), a flash memory, a hard disc drive, or any combination thereof. The memory 1403 may include a storage located apart from the processor 1402. In this case, the processor 1402 may access the memory 1403 via the network interface 1401 or an I/O interface (not illustrated).

The memory 1403 may store one or more software modules (computer programs) 1404 including instructions and data to perform the processing of the AMF 3 described in the above embodiments. In some implementations, the processor 1402 may be configured to load the one or more software modules 1404 from the memory 1403 and execute the loaded software modules, thereby performing the processing of the AMF 3 described in the above embodiments.

As described above with reference to FIGS. 12, 13, and 14, each of the processors that the UE 1, the gNB 2, and the AMF 3 according to the above embodiments include executes one or more programs including instructions for causing a computer to execute an algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the programs to a computer via a wired communication line (e.g., electric wires, and optical fibers) or a wireless communication line.

The above-described embodiments are merely examples of applications of the technical ideas obtained by the inventor. These technical ideas are not limited to the above-described embodiments and various modifications can be made thereto.

The whole or part of the embodiments disclosed above can be described as, but not limited to, the following supplementary notes.

(Supplementary Note 1)
A radio terminal comprising:
at least one memory; and
at least one processor coupled to the at least one memory and configured to transmit a message containing a Non-Access Stratum (NAS) security parameter to a Radio Access Network (RAN) node, during a procedure for requesting the RAN node to broadcast on-demand system information.

(Supplementary Note 2)
The radio terminal according to Supplementary Note 1, wherein the on-demand system information is broadcast by the RAN node in response to successful authentication that is performed by a core network based on the NAS security parameter.

(Supplementary Note 3)
The radio terminal according to Supplementary Note 1 or 2, wherein the NAS security parameter includes one or more bit of a Message Authentication Code for NAS for Integrity (NAS-MAC) calculated by the radio terminal.

(Supplementary Note 4)
The radio terminal according to Supplementary Note 3, wherein the NAS security parameter further includes one or more bits of a NAS COUNT used to calculate the NAS-MAC.

(Supplementary Note 5)
The radio terminal according to Supplementary Note 1 or 2, wherein the message further includes:
a first set of bits included in a temporary identifier assigned to the radio terminal by a core network; and
a third set of bits that is associated in advance with a second set of bits included in the temporary identifier and has a length shorter than the second set of bits.

(Supplementary Note 6)
The radio terminal according to Supplementary Note 5, wherein the at least one processor is configured to receive system information, which is broadcast by the RAN node and includes a list indicating association between the second set of bits and the third set of bits.

(Supplementary Note 7)
The radio terminal according to Supplementary Note 5 or 6, wherein
the temporary identifier is a 5G-S-Temporary Mobile Subscription Identifier (5G-S-TMSI),
the first set of bits is a 5G-TMSI, and
the second set of bits is an Access and Mobility Management Function (AMF) Set ID and an AMF Pointer.

(Supplementary Note 8)
The radio terminal according to any one of Supplementary Notes 1 to 7, wherein the at least one processor is configured to, after transmitting the message, receive an acknowledgement message from the RAN node,
wherein the acknowledgement message indicates a waiting time until broadcast of the on-demand system information is started.

(Supplementary Note 9)
The radio terminal according to any one of Supplementary Notes 1 to 8, wherein the procedure is a random access procedure to request the system information.

(Supplementary Note 10)
A Radio Access Network (RAN) node comprising:
at least one memory; and
at least one processor coupled to the at least one memory and configured to:
receive a message containing a Non-Access Stratum (NAS) security parameter from a radio terminal, during a procedure in which the radio terminal requests the RAN node to broadcast on-demand system information;
send an authentication request message containing the NAS security parameter to a core network node, in order to request authentication of the radio terminal; and
broadcast the on-demand system information in response to receiving from the core network node an authentication response message indicating successful authentication of the radio terminal.

(Supplementary Note 11)
The RAN node according to Supplementary Note 10, wherein the NAS security parameter includes one or more bits of a Message Authentication Code for NAS for Integrity (NAS-MAC) calculated by the radio terminal.

(Supplementary Note 12)
The RAN node according to Supplementary Note 11, wherein the NAS security parameter further includes one or more bits of a NAS COUNT used to calculate the NAS-MAC.

(Supplementary Note 13)
The RAN node according to any one of Supplementary Notes 10 to 12, wherein the message received from the radio terminal further includes:
a first set of bits included in a temporary identifier assigned to the radio terminal by a core network; and
a third set of bits that is associated in advance with a second set of bits included in the temporary identifier and has a length shorter than the second set of bits.

(Supplementary Note 14)
The RAN node according to Supplementary Note 13, wherein the at least one processor is configured to estimate the temporary identifier from the first set of bits and the third set of bits received form the radio terminal and include the temporary identifier in the authentication request message.

(Supplementary Note 15)

The RAN node according to Supplementary Note 13 or 14, wherein the at least one processor is configured to periodically broadcast system information including a list indicating association between the second set of bits and the third set of bits.

(Supplementary Note 16)

The RAN node according to any one of Supplementary Notes 13 to 15, wherein
the temporary identifier is a 5G-S-Temporary Mobile Subscription Identifier (5G-S-TMSI),
the first set of bits is a 5G-TMSI, and
the second set of bits is an Access and Mobility Management Function (AMF) Set ID and an AMF Pointer.

(Supplementary Note 17)

The RAN node according to any one of Supplementary Notes 10 to 16, wherein the at least one processor is configured to include, in the authentication request message, a plurality of NAS security parameters each received from a respective one of a plurality of radio terminals that have requested broadcast of the system information.

(Supplementary Note 18)

The RAN node according to Supplementary Note 17, wherein the authentication response message is sent by the core network node in response to successful authentication of at least one of the plurality of radio terminals.

(Supplementary Note 19)

The RAN node according to any one of Supplementary Notes 10 to 18, wherein the at least one processor is configured to, after receiving the message from the radio terminal, transmit an acknowledgement message to the radio terminal,
wherein the acknowledgement message indicates a waiting time until broadcast of the on-demand system information is started.

(Supplementary Note 20)

The RAN node according to any one of Supplementary Notes 10 to 19, wherein the procedure is a random access procedure to request the system information.

(Supplementary Note 21)

A core network node comprising:
at least one memory; and
at least one processor coupled to the at least one memory and configured to:
receive an authentication request message from a Radio Access Network (RAN) node, the authentication request message containing a NAS security parameter being transmitted from a radio terminal during a procedure in which the radio terminal requests the RAN node to broadcast on-demand system information; and
send to the RAN node an authentication response message indicating whether authentication based on the NAS security parameter is successful or not.

(Supplementary Note 22)

The core network node according to Supplementary Note 21, wherein the authentication response message is used by the RAN node to determine whether to broadcast the on-demand system information.

(Supplementary Note 23)

The core network node according to Supplementary Note 21 or 22, wherein if the authentication response message indicates successful authentication, the authentication response message triggers the RAN node to broadcast the on-demand system information.

(Supplementary Note 24)

The core network node according to any one of Supplementary Notes 21 to 23, wherein the NAS security parameter includes one or more bits of a Message Authentication Code for NAS for Integrity (NAS-MAC) calculated by the radio terminal.

(Supplementary Note 25)

The core network node according to Supplementary Note 24, wherein the NAS security parameter further includes one or more bits of a NAS COUNT used to calculate the NAS-MAC.

(Supplementary Note 26)

The core network node according to any one of Supplementary Notes 21 to 25, wherein the authentication request message includes a plurality of NAS security parameters each received by the RAN node from a respective one of a plurality of radio terminals that have requested broadcast of the system information.

(Supplementary Note 27)

The core network node according to Supplementary Note 26, wherein the at least one processor is configured to send the authentication response message in response to successful authentication of at least one of the plurality of radio terminals.

(Supplementary Note 28)

A method performed by a radio terminal, the method comprising transmitting a message containing a Non-Access Stratum (NAS) security parameter to a Radio Access Network (RAN) node, during a procedure for requesting the RAN node to broadcast on-demand system information.

(Supplementary Note 29)

A method performed by a Radio Access Network (RAN) node, the method comprising:
receiving a message containing a Non-Access Stratum (NAS) security parameter from a radio terminal, during a procedure in which the radio terminal requests the RAN node to broadcast on-demand system information;
sending an authentication request message containing the NAS security parameter to a core network node, in order to request authentication of the radio terminal; and
broadcasting the on-demand system information in response to receiving from the core network node an authentication response message indicating successful authentication of the radio terminal.

(Supplementary Note 30)

A method performed by a core network node, the method comprising:
receiving an authentication request message from a Radio Access Network (RAN) node, the authentication request message containing a NAS security parameter being transmitted from a radio terminal during a procedure in which the radio terminal requests the RAN node to broadcast on-demand system information; and
sending to the RAN node an authentication response message indicating whether authentication based on the NAS security parameter is successful or not.

(Supplementary Note 31)

A program for causing a computer to perform a method for a radio terminal, the method comprising transmitting a message containing a Non-Access Stratum (NAS) security parameter to a Radio Access Network (RAN) node, during a procedure for requesting the RAN node to broadcast on-demand system information.

(Supplementary Note 32)

A program for causing a computer to perform a method for a Radio Access Network (RAN) node, the method comprising:

receiving a message containing a Non-Access Stratum (NAS) security parameter from a radio terminal, during a procedure in which the radio terminal requests the RAN node to broadcast on-demand system information;

sending an authentication request message containing the NAS security parameter to a core network node, in order to request authentication of the radio terminal; and broadcasting the on-demand system information in response to receiving from the core network node an authentication response message indicating successful authentication of the radio terminal.

(Supplementary Note 33)

A program for causing a computer to perform a method for a core network node, the method comprising:

receiving an authentication request message from a Radio Access Network (RAN) node, the authentication request message containing a NAS security parameter being transmitted from a radio terminal during a procedure in which the radio terminal requests the RAN node to broadcast on-demand system information; and sending to the RAN node an authentication response message indicating whether authentication based on the NAS security parameter is successful or not.

This application is based upon and claims the benefit of priority from Japanese Patent Application No. 2020-015021, filed on Jan. 31, 2020, the disclosure of which is incorporated herein in its entirety by reference.

REFERENCE SIGNS LIST

1 UE
2 gNB
3 AMF
1203 Baseband Processor
1204 Application Processor
1206 Memory
1207 Modules
1304 Processor
1305 Memory
1306 Modules
1402 Processor
1403 Memory
1404 Modules

What is claimed is:

1. A radio terminal comprising:
at least one memory; and
at least one processor coupled to the at least one memory and configured to transmit a message containing a Non-Access Stratum (NAS) security parameter to a Radio Access Network (RAN) node, during a procedure for requesting the RAN node to broadcast on-demand system information,
wherein the message further includes:
a first set of bits included in a temporary identifier assigned to the radio terminal by a core network; and
a third set of bits that is associated in advance with a second set of bits included in the temporary identifier and has a length shorter than the second set of bits.

2. The radio terminal according to claim 1, wherein the on-demand system information is broadcast by the RAN node in response to successful authentication that is performed by a core network based on the NAS security parameter.

3. The radio terminal according to claim 1, wherein the NAS security parameter includes one or more bits of a Message Authentication Code for NAS for Integrity (NAS-MAC) calculated by the radio terminal.

4. The radio terminal according to claim 3, wherein the NAS security parameter further includes one or more bits of a NAS COUNT used to calculate the NAS-MAC.

5. The radio terminal according to claim 1, wherein the at least one processor is configured to receive system information, which is broadcast by the RAN node and includes a list indicating association between the second set of bits and the third set of bits.

6. The radio terminal according to claim 1, wherein
the temporary identifier is a 5G-S-Temporary Mobile Subscription Identifier (5G-S-TMSI),
the first set of bits is a 5G-TMSI, and
the second set of bits is an Access and Mobility Management Function (AMF) Set ID and an AMF Pointer.

7. The radio terminal according to claim 1, wherein the at least one processor is configured to, after transmitting the message, receive an acknowledgement message from the RAN node,
wherein the acknowledgement message indicates a waiting time until broadcast of the on-demand system information is started.

8. The radio terminal according to claim 1, wherein the procedure is a random access procedure to request the system information.

9. A Radio Access Network (RAN) node comprising:
at least one memory; and
at least one processor coupled to the at least one memory and configured to:
receive a message containing a Non-Access Stratum (NAS) security parameter from a radio terminal, during a procedure in which the radio terminal requests the RAN node to broadcast on-demand system information;
send an authentication request message containing the NAS security parameter to a core network node, in order to request authentication of the radio terminal; and
broadcast the on-demand system information in response to receiving from the core network node an authentication response message indicating successful authentication of the radio terminal,
wherein the message received from the radio terminal further includes:
a first set of bits included in a temporary identifier assigned to the radio terminal by a core network; and
a third set of bits that is associated in advance with a second set of bits included in the temporary identifier and has a length shorter than the second set of bits.

10. The RAN node according to claim 9, wherein the NAS security parameter includes one or more bits of a Message Authentication Code for NAS for Integrity (NAS-MAC) calculated by the radio terminal.

11. The RAN node according to claim 10, wherein the NAS security parameter further includes one or more bits of a NAS COUNT used to calculate the NAS-MAC.

12. The RAN node according to claim 9, wherein the at least one processor is configured to estimate the temporary identifier from the first set of bits and the third set of bits received form the radio terminal and include the temporary identifier in the authentication request message.

13. The RAN node according to claim 9, wherein the at least one processor is configured to periodically broadcast system information including a list indicating association between the second set of bits and the third set of bits.

14. The RAN node according claim 9, wherein
the temporary identifier is a 5G-S-Temporary Mobile Subscription Identifier (5G-S-TMSI),
the first set of bits is a 5G-TMSI, and
the second set of bits is an Access and Mobility Management Function (AMF) Set ID and an AMF Pointer.

15. The RAN node according to claim 9, wherein the at least one processor is configured to include, in the authentication request message, a plurality of NAS security parameters each received from a respective one of a plurality of radio terminals that have requested broadcast of the system information.

16. The RAN node according to claim 15, wherein the authentication response message is sent by the core network node in response to successful authentication of at least one of the plurality of radio terminals.

17. The RAN node according to claim 9, wherein the at least one processor is configured to, after receiving the message from the radio terminal, transmit an acknowledgement message to the radio terminal,
wherein the acknowledgement message indicates a waiting time until broadcast of the on-demand system information is started.

* * * * *